United States Patent
Ebner et al.

(10) Patent No.: US 6,718,454 B1
(45) Date of Patent: Apr. 6, 2004

(54) SYSTEMS AND METHODS FOR PREFETCH OPERATIONS TO REDUCE LATENCY ASSOCIATED WITH MEMORY ACCESS

(75) Inventors: Sharon M. Ebner, Mountain View, CA (US); John A. Wickeraad, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/563,060

(22) Filed: Apr. 29, 2000

(51) Int. Cl.[7] .............................................. G06F 12/00
(52) U.S. Cl. ...................... 711/213; 711/118; 711/137; 711/204
(58) Field of Search ................................ 711/118, 137, 711/140, 147, 150, 151, 168, 204, 213, 217–220

(56) References Cited

U.S. PATENT DOCUMENTS

| | | | | |
|---|---|---|---|---|
| 4,918,587 A | * | 4/1990 | Pechter et al. ............... | 711/218 |
| 5,829,042 A | | 10/1998 | Leung ......................... | 711/147 |
| 6,029,228 A | * | 2/2000 | Cai et al. ..................... | 711/137 |
| 6,199,154 B1 | * | 3/2001 | Witt ............................ | 712/205 |
| 6,233,645 B1 | * | 5/2001 | Chrysos et al. ............. | 710/244 |
| 6,397,326 B1 | * | 5/2002 | Horton et al. ............... | 712/240 |
| 6,453,389 B1 | * | 9/2002 | Weinberger et al. ........ | 711/137 |
| 6,460,115 B1 | * | 10/2002 | Kahle et al. ................. | 711/122 |
| 6,490,658 B1 | * | 12/2002 | Ahmed et al. ............... | 711/140 |

* cited by examiner

Primary Examiner—T. V. Nguyen

(57) ABSTRACT

A data processing system includes a memory storing data to be retrieved and an I/O controller configured to request data stored in the memory at a plurality of addresses. The I/O may be responsive to an internal or external device requesting such data. A fetch machine provides or initiates retrieval of data stored at the requested address, while a prefetch machine predicts future requests and keeps track of memory requests already initiated and queued. Thus, the prefetch machine is responsive to the plurality addresses to predict others of the addresses and provide or initiate retrieval of data stored thereat. To avoid prefetching information already requested and in a fetch queue, the prefetch machine includes a memory storing a last one of the addresses subject to prefetching. Finally, to avoid conflicts between currently requested data and prefetch operation, an arbiter resolves memory accesses or data requests initiated by the fetch and prefetch machines.

12 Claims, 2 Drawing Sheets

| CYCLE | I/O CARD | FETCH MACHINE | PREFETCH MACHINE |
|---|---|---|---|
| 1 | READ MEMORY A0 | | |
| 2 | | FETCH MEMORY A0 | |
| 3 | | | PREFETCH MEMORY A1 |
| 4 | | | PREFETCH MEMORY A2 |
| 5 | | | PREFETCH MEMORY A3 |
| 6 | DATA A0 AVAILABLE | | |
| 7 | | | PREFETCH MEMORY A4 |
| 8 | | A1 RETURNS | |
| 9 | READ MEMORY A1 DATA A1 AVAILABLE | A2 RETURNS | PREFETCH MEMORY A5 |
| 10 | READ MEMORY A2 DATA A2 AVAILABLE | A3 RETURNS | PREFETCH MEMORY A6 |
| 11 | DATA A3 AVAILABLE | | PREFETCH MEMORY A7 |
| 12 | | A4 RETURNS | |
| 13 | DATA A4 AVAILABLE | | PREFETCH MEMORY A8 |
| 14 | | | |
| 15 | READ MEMORY B0 | | |
| 16 | | FETCH MEMORY B0 | |
| 17 | | | PREFETCH MEMORY B1 |
| 18 | | | PREFETCH MEMORY B2 |
| 19 | | | PREFETCH MEMORY B3 |
| 20 | DATA B0 AVAILABLE | | |

*FIG. 3*

| CYCLE | I/O CARD #1 | I/O CARD #2 | FETCH-RETURN MACHINE | PREFETCH MACHINE | TAG LOOKUP |
|---|---|---|---|---|---|
| 0 | READ A0 | | | | |
| 1 | | | FETCH A0 | | LOOKUP A0 |
| 2 | | READ A100 | | PREFETCH A1 | LOOKUP A1 |
| 3 | | | FETCH A100 | | LOOKUP A100 |
| 4 | | | A0 RETURNS | PREFETCH A2 | LOOKUP A2 |
| 5 | DATA A0 | | | PREFETCH A101 | LOOKUP A101 |
| 6 | | | A100 RETURNS | PREFETCH A3 | LOOKUP A3 |
| 7 | | DATA A100 | | PREFETCH A102 | LOOKUP A102 |
| 8 | | | A1 RETURNS | PREFETCH A4 | LOOKUP A4 |
| 9 | DATA A1 | | | PREFETCH A103 | LOOKUP A103 |
| 10 | | | | PREFETCH A5 | LOOKUP A5 |

*FIG. 4*

SYSTEMS AND METHODS FOR PREFETCH OPERATIONS TO REDUCE LATENCY ASSOCIATED WITH MEMORY ACCESS

BACKGROUND

In a multiprocessor system, problems arise when more than one processor attempts to access a memory location. While multiple processors have access to a common memory location, if one of those processors attempts to update the information in the memory location without informing the other processors also having access to the memory location, mismatches may occur resulting in a loss of data coherency. This is of particular concern in multiprocessor systems having memory cache associated with each processor, i.e., processor cache. The processor cache stores information most recently accessed by the processor. Processor cache is typically organized out into cache lines of, for example, 64 bits of data. Therefore, when a processor attempts to access a memory location, it first searches its cache to determine if it already has a copy of the information stored in that memory location. If the memory location is not currently stored in the processor cache, the processor attempts to obtain a copy of that memory location from the main memory. Alternatively, if the memory location is already available in the processor cache and is valid, the processor can immediately use the copy of data stored in the cache. Of course, conflict issues arise when multiple processors attempt to access the same memory location.

Regardless of the protocol used, the job of a cache coherency protocol is to make sure that if any caches in a system (especially cache between a processor and a memory or between system input and output in a memory and a processor) has exclusive use of the line, no other cache has a copy of the same exclusive line. Cache coherency protocol can be implemented by processors or by memory.

As previously described, when a processor requires access to a memory location, it first checks its processor cache to determine if the information is available locally. If the information is not present or is invalid, the processor must access the main memory to retrieve the data. This access methodology is not limited to processors. Other devices such as printers which require access to memory may also store data locally or access the main memory. Such a system and method is described, for example, in U.S. Pat. No. 5,829,042 entitled "Prefetch Operation for Network Peripheral Device Having Shared Memory" of Leung and incorporated herein by reference in its entirety. When devices use input/output (I/O) subsystems to access the memory, mismatches between device speed and I/O subsystem speeds can slow the device's access to the memory. The I/O subsystems often have longer memory latency times than that of processors in other devices and often have different access patterns. I/O subsystem transfers tend to be long bursts of data that are linear and sequential in fashion. Prefetch data techniques allow I/O subsystems to request information stored in memory prior to the device's need for that information. By prefetching data ahead of data consumption by the device, data can be continuously sent to the device without interruption thereby enhancing I/O system performance. For example, the amount of time necessary for I/O subsystems to access the memory is called the memory latency. To maximize the efficiency of the device the amount of information which is prefetched is determined by the speed of the device relative to the memory latency. Faster devices benefit from the larger amount of prefetched data (also called deeper prefetches) particularly when memory latency is high. Thus, the information required by the device is retrieved from memory before the device requires the information. This occurs because the prefetch operation requests the data before the device requests the data and allows more time for the memory information to be accessed and provide the data in anticipation of the upcoming request.

However, by their nature prefetch operations are speculative. In other words, since the device has not requested the specific memory location, a prefetch operation anticipates the data that the device will require before it has been requested. Typically a state machine is used to access the information requested by the device. This state machine is also used to prefetch data speculatively. Thus, the speculative prefetch activity consumes resources and time that could be used for fetching data that has been requested by the device. If the data which is speculatively accessed by the prefetched operation is not used, time has been wasted and overall input/output speed has been reduced.

Analogous to the processor's check for the processor cache for requested information, prefetches are checked for the availability of data once a device has requested the data. When the amount of data contained in the prefetch is increased, the overhead necessary to check the prefetch data for the availability of the requested data is increased. Accordingly, a need exists for a device and method of providing prefetch data that minimizes or eliminates the associated overhead required to check the information once a device has requested access to memory. Additionally, a need exists for a prefetch operation that does not compete or interfere with a device's request for access to a memory location.

SUMMARY OF THE INVENTION

These and other objects, features and technical advantages are achieved by a system and method which according to one aspect of the invention, a data processing system includes a memory storing data to be retrieved and an I/O controller configured to request data stored in the memory at a plurality of addresses. The I/O may be responsive to an internal or external device requesting such data. A fetch machine provides or initiates retrieval of data stored at the requested address, while a prefetch machine predicts future requests and keeps track of memory requests already initiated and queued. Thus, the prefetch machine is responsive to the plurality addresses to predict others of the addresses and provide or initiate retrieval of data stored thereat. To avoid prefetching information already requested and in a to fetch queue, the prefetch machine includes a memory storing a last one of the addresses subject to prefetching. Finally, to avoid conflicts between currently requested data and prefetch operation, an arbiter resolves memory accesses or data requests initiated by the fetch and prefetch machines.

According to a feature of the invention, the prefetch machine is responsive to addresses of data already supplied to inhibit an inclusion thereof in prefetching the data stored in the memory.

According to another aspect of the invention, a method of retrieving data from a memory is initiated upon receiving a first address of data to be retrieved. A fetch is initiated of data stored at the first address and a prefetch operation is initiated including predicting a first plurality of additional addresses corresponding to first data expected next to be requested. One or more of the predicted additional addresses are stored, for example the latest one of the addresses used to initiate a data request from memory. A prefetch is initiated of the first data expected next to be requested. The method accommodates a subsequent data request upon receiving a next address of data to be retrieved. If a prefetch of the next requested data has already been initiated, then this data is retrieved and provided to the requester. Otherwise, a new fetch is initiated when this second address is not included among the first data expected next to be addressed. The prefetch mechanism also adjusts to an erroneous prediction as indicated by the request not being within the range of data prefetched. Thus, the prefetch operations include selectively (i) continuing to initiate a prefetch of data stored at addresses predicted to follow the one of the additional addresses when the second address is included among the first data expected next to be requested, and (ii) predicting a revised second plurality of additional addresses corresponding to second data expected next to be requested when the second address is not included among the first data expected next.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 3 depicts a relationship between fetch requests, fetch data, prefetch requester and cycles;

FIG. 4 depicts a relationship between fetches and prefetches when more than one I/O device is present.

DETAILED DESCRIPTION

Figure 1:
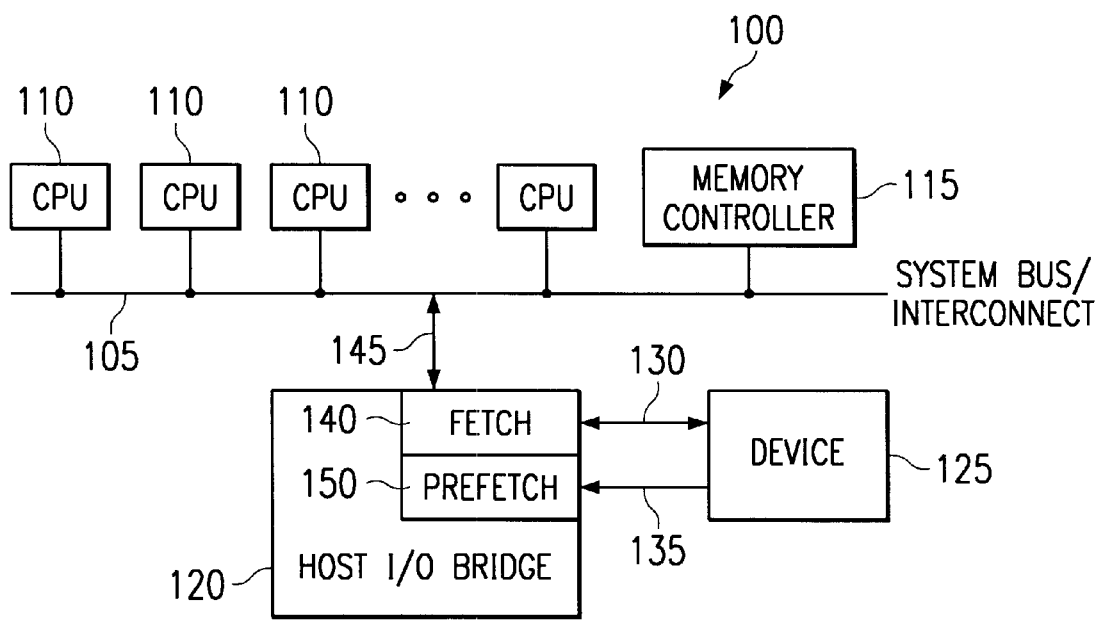
FIG. 1 is a block diagram of a system bus/interconnect which establishes communications between CPUs, a memory controller, a host I/O bridge and a memory accessing device.

FIG. 1 illustrates a system 100 in which a system bus 105 interconnects a number of CPUs 110 together. Also resident on the system bus 105 is a memory controller 115 and a host I/O bridge 120. A device 125 which accesses memory is connected to the host I/O bridge 120 through links 130 and 135. Device 125 may be part of system 100, as shown, or may be external, such as peripheral.

When the device 125 requires access to memory, fetch subsystem 140 sends a message via link 130 to host I/O bridge 120. Host I/O bridge 120 responds by forwarding the message across link 145 to the system bus 105. The system bus 105 then communicates the request to memory controller 115. In the absence of contentions with other devices for the memory location, memory controller 115 then accesses the appropriate cache line and sends the information across the system bus 105 across the link between the system bus interconnect and host I/O bridge 145, through host I/O bridge 120, across the link 130 to the fetch subsystem 140. A copy of the information contained in the memory location is then stored in the fetch subsystem 140. The device 125 can then accesses that information when necessary.

In a preferred embodiment of the present invention a prefetch subsystem 150 is also present in the device. When the device.125 needs to access a specific location through the fetch subassembly 140 the prefetch subsystem 150 attempts to anticipate the next memory location that the device 125 will access. Accordingly, prefetch subsystem 150 sends a request to access memory via link 135 to the host I/O bridge 120, which will forward the request via link 145 to the system bus 105. From the system bus 105 the request will be passed to the memory controller 115 that will access the specific memory location required. The information stored in that memory location will be sent by the memory controller 115 via the system bus 105 and link 145 to host I/O bridge 120. The information stored at the memory address will then be sent across link 130 to be stored in local memory. While the request for access to a memory location from the prefetch goes out across link 135, the returning information which was contained at the memory location returns via link 130. Numerous prefetch operations can be performed.

In a preferred embodiment of device 125 the fetch subassembly 140 has a higher priority than the prefetch subsystem 150. This higher priority in the fetch subassembly 140 prevents the prefetch subassembly 150 from consuming too many system resources in anticipation of the memory requirements of device 125. Since the fetch subassembly 140 has a higher priority, the actual memory requests coming from device 125 have a higher priority than the speculative memory accesses requested by prefetch subassembly 150.

Figure 2:
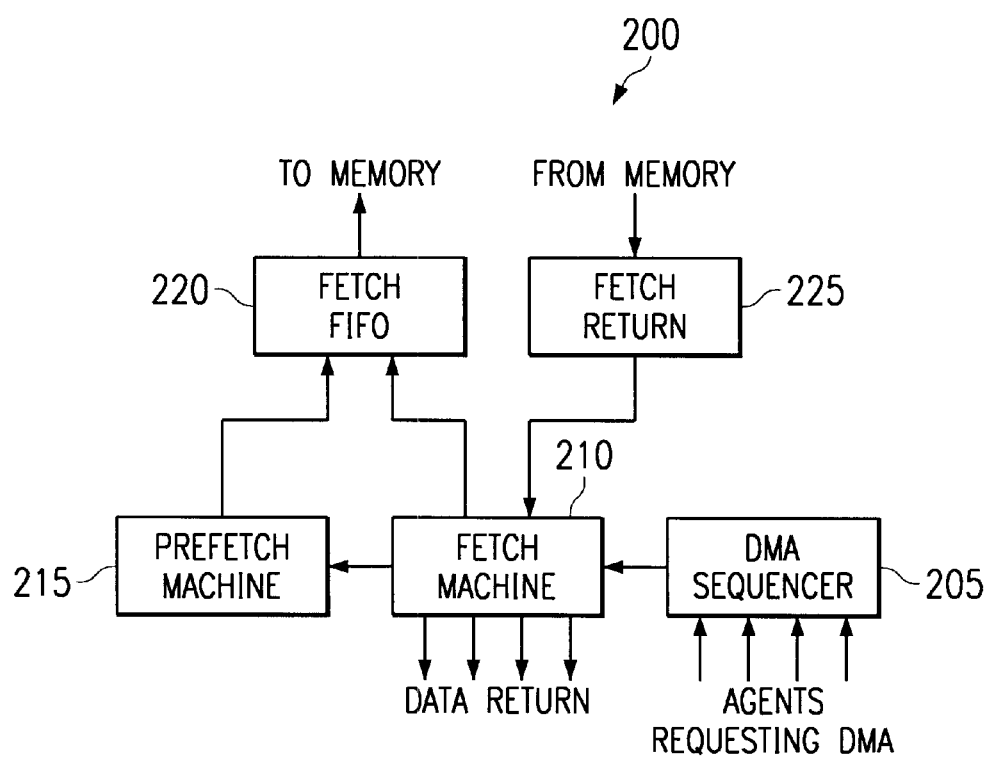
FIG. 2 is a block diagram of the interrelationship between the fetch machine, the prefetch machine and the DMA sequencer.

FIG. 2 illustrates system 200 as an alternative preferred embodiment of the present invention. The direct memory access or DMA sequencer 205 determines the memory address to be accessed. These memory access requesters can originate from multiple devices. The DMA sequencer 205 then sends this information to the fetch machine 210. The fetch machine 210 sends this information both to the prefetch machine 215 and to the fetch first-in, first-out stack or FIFO 220. The fetch FIFO 220 then accesses the memory to acquire the necessary data. Once the necessary data is accessed and retrieved, it is sent from memory to the fetch return 225 and then to the fetch machine 210. The data is then stored for later access by the requesting device. The prefetch machine 215 then accesses additional memory locations via fetch FIFO 220 in anticipation of future memory requests. This prefetch requested data is also returned via fetch return 225 and fetch machine 210.

FIG. 3 illustrates the coordination between the I/O card request, the fetch machine 210 and the prefetch machine 215. In FIG. 3, the prefetch depth used is 3, however any depth can be used. At cycle 1 the I/O card attempts to read memory location A0. In response to the I/O card's request to read memory location A0 in cycle 1, the fetch machine in cycle 2 fetches memory location A0. In response to fetch machine's request to fetch memory location A0, the prefetch machine at cycles 3, 4 and 5 sends control messages to prefetch memory locations A1 A2 and A3, respectively. Although the illustration in FIG. 3 shows a latency of four cycles, the latency can typically vary dynamically depending on various system factors. Assuming it takes four (4) system cycles to receive memory back after a fetch has been issued, A0 data is available to the I/O card in cycle 6. In cycle 7 the prefetch machine, in an attempt to stay four (4) steps ahead of the current I/O card request, requests prefetch of memory A4. In cycle 8 the information stored in memory location A1 returns to the fetch machine and is available to the I/O card in cycle 9. Since the data is currently available this saves four (4) cycles in the retrieval of information from memory location A1. Similarly, because of the prefetch's access to memory location A2 in cycle 4, the information stored in memory location A2 is immediately available to the I/O card and connected device (not shown).

As previously described, the fetch machine has priority over the prefetch machine. Thus, in cycle 15 when the I/O card requests read memory location B0, the fetch machine's request for access to memory location B0 at Step 16 overrides any access the prefetch machine is currently undertaking. In response to the fetch request at cycle 16, the prefetch machine again attempts to anticipate the next block of information required by the I/O card. In this case, in cycle 17 the prefetch machine attempts to prefetch the information available in memory location B1 and in cycle 18, the prefetch machine predicts that the information contained in memory location B2 will be necessary. If the prefetch machine is programmed for prefetch to a depth of 3, in cycle 19 the prefetch machine accesses memory location B3, again in anticipation of the I/O card's need for that information.

Additionally, during Cycle 9 when the I/O card requests access to the information in memory, A1 the prefetch machine responds by predicting that the information stored in memory location A5 will also be required in the future and initiates retrieval of this additional information. Thus, the prefetch machine keeps track of the information that has already been requested and anticipates, based on the I/O card's current use of information, what additional information will be required.

FIG. 4 depicts a relationship between two I/O cards, the fetch return machine, the prefetch machine and the tag look-up. Ignoring for the moment the column labeled "I/O card No. 2", in cycle 0 the I/O card No. 1 requests that memory location A0 be read. In response to that request, in cycle 1, the fetch return machine fetches memory location A0. Accordingly, also in cycle 1, a tag lookup is set to lookup A0. In response to the fetch return machine's fetch of memory location A0 at cycle 2, the prefetch machine predicts the need for the information located in memory location A1 and attempts to prefetch the information stored therein. In response to this prefetch operation, the tag lookup in cycle 2 is changed to lookup A1. The tag lookup is the check required to ensure that the data being fetched is not already present in the cache memory.

Now referring to the column labeled "I/O card No. 2" at cycle 2, I/O card No. 2 requests the data stored at memory location 100, which is read. At cycle 2 the I/O card No. 2 requests the data stored at memory location A100 which it is also read. In response, at cycle 3, the fetch return machine attempts to fetch the information stored at memory location A100. Simultaneously, the tag look up value is updated to look up A100. During cycle 4, the fetch return machine receives the information stored in memory location A0 and the prefetch machine attempts to prefetch the information located in memory location A2. Once the prefetch machine attempts to look up the information located in memory location A2, the lookup tag in cycle 4 is updated to lookup A2. In a preferred embodiment of the current invention, cycle 3's fetch A100, resulting from the I/O card No. 2's request to read memory location A100, takes priority over the prefetch machine's operation. Therefore, during cycle 3 the fetch machine's fetch of memory location A100 precludes any operation from the prefetch machine during the same cycle. During cycle 4 the prefetch machine attempts to prefetch the information stored in memory location A2 and the tag lookup is updated to lookup A2. Also in cycle 4 the information retained in memory location A0 is returned to the fetch return machine. At cycle 5, since the I/O card No. 1 requested A0 data in cycle 0, the A0 data is returned to the I/O card. The prefetch machine in cycle 5 also attempts to anticipate the next set of data required by I/O card No. 2 by prefetching the information contained in memory location A101. In response, the tag lookup is adjusted to lookup A101. In cycle 6, the information contained in memory location A100 is returned to the fetch return machine and passed to the I/O card No. 2 in cycle 7. In cycle 8, in response to the prefetch operation which occurred in cycle 2 the A1 data is returned to the fetch return machine and in cycle 9 that data is made available to I/O card No. 1.

The use of separate fetch and prefetch machines in the present invention ensures that the prefetch process does not interfere with the fetch operations. The fetches prioritization over the prefetch process ensures that even when the two operations are queued, the time required for the fetch operation is not impacted by the presence of the prefetch process. The use of a register to track the last prefetch performed allows the prefetched data to be accessible sooner and ensures more efficient operation of the resources.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A data processing system, comprising:
   a memory;
   an I/O controller configured to request data stored in said memory at a plurality of addresses;
   a fetch machine configured to provide data stored at ones of said plurality of addresses;
   a prefetch machine responsive to some of said plurality of addresses to predict others of said addresses and provide data stored thereat, said prefetch machine including a memory storing a last one of said addresses subject to prefetching; and
   an arbiter configured to resolve conflicts between data requests made by said fetch and prefetch machines.

2. The data processing system according to claim 1 wherein said prefetch machine is responsive to addresses of data already supplied to inhibit an inclusion thereof in prefetching said data stored in said memory.

3. The data processing system according to claim 1 wherein said arbiter inhibits a data request initiated by said prefetch machine in preference to a data request initiated by said fetch machine.

4. The data processing system according to claim 1 wherein said arbiter interleaves data requests of said fetch and prefetch machines according to predetermined priority rules.

5. The data processing system according to claim 1 wherein said fetch and prefetch machines are separate and operate independently of each other.

6. A method of providing data from a memory, comprising the steps of:

receiving a first address of data to be retrieved;

initiating a fetch of data stored at said first address;

predicting a first plurality of additional addresses corresponding to first data expected next to be requested;

storing one of said first plurality of additional addresses;

initiating a prefetch of said first data expected next to be requested;

receiving a second address of data to be retrieved;

selectively initiating a fetch of said data at said second address when not included among said first data expected next to be requested; and selectively (i) continuing to initiate a prefetch of data stored at addresses predicted to follow said one of said additional addresses when said second address is included among said first data expected next to be requested, and (ii) predicting a revised second plurality of additional addresses corresponding to second data expected next to be requested when said second address is not included among said first data expected next to be requested.

7. A data processing system, the system comprising:

means for storing data;

means for requesting data stored at a plurality of addresses in said storing means;

means for providing data stored at ones of said plurality of addresses;

prefetching means responsive to some of said plurality of addresses for predicting others of said addresses and for providing data stored thereat, said prefetching means including a memory storing a last one of said addresses subject to prefetching; and means for resolving conflicts between data requests made by said providing means and said prefetching means.

8. The system of claim 7, wherein said prefetching means comprises:

means for inhibiting an inclusion of addresses already supplied in prefetching said data stored in said storing means.

9. The system of claim 7, wherein said resolving means comprises:

means for inhibiting a data request initiated by said prefetching means in preference to a data request initiated by said providing means.

10. The system of claim 7, wherein said resolving means comprises:

means for interleaving data requests of said providing means and said prefetching means according to predetermined priority rules.

11. The system of claim 7, wherein said resolving means comprises:

means for interleaving data requests of said providing means and said prefetching means according to dynamically calculated priority rules.

12. The system of claim 7, further comprising:

means for operating said providing means and said prefetching means independently of one another.

* * * * *